US008723843B2

(12) United States Patent
Huang et al.

(10) Patent No.: US 8,723,843 B2
(45) Date of Patent: May 13, 2014

(54) PIXEL DRIVING CIRCUIT WITH CAPACITOR HAVING THRESHOLD VOLTAGES INFORMATION STORING FUNCTION, PIXEL DRIVING METHOD AND LIGHT EMITTING DISPLAY DEVICE

(75) Inventors: Sung-Hui Huang, Hsinchu (TW); Ted-Hong Shinn, Hsinchu (TW); Wei-Chou Lan, Hsinchu (TW); Chin-Wen Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 597 days.

(21) Appl. No.: 12/830,031

(22) Filed: Jul. 2, 2010

(65) Prior Publication Data

US 2011/0304593 A1 Dec. 15, 2011

(30) Foreign Application Priority Data

Jun. 10, 2010 (TW) ............................... 99118888 A

(51) Int. Cl.
*G06F 3/038* (2013.01)
*G09G 5/00* (2006.01)

(52) U.S. Cl.
USPC ............................................. 345/204; 345/76

(58) Field of Classification Search
USPC .................................................... 345/76, 204
See application file for complete search history.

(56) References Cited

U.S. PATENT DOCUMENTS

| | | | | |
|---|---|---|---|---|
| 6,777,888 | B2 | 8/2004 | Kondo | |
| 6,970,149 | B2 | 11/2005 | Chung et al. | |
| 7,038,392 | B2 | 5/2006 | Libsch et al. | |
| 7,154,454 | B2 | 12/2006 | Okabe et al. | |
| 7,239,309 | B2 | 7/2007 | Smith et al. | |
| 7,317,435 | B2 | 1/2008 | Hsueh | |
| 7,319,447 | B2 | 1/2008 | Hsueh | |
| 7,352,345 | B2 | 4/2008 | Li | |
| 7,463,222 | B2 | 12/2008 | Fish et al. | |
| 8,243,055 | B2 * | 8/2012 | Abe | 345/211 |
| 2004/0056828 | A1 * | 3/2004 | Choi et al. | 345/82 |
| 2005/0007357 | A1 | 1/2005 | Yamashita et al. | |
| 2008/0315189 | A1 | 12/2008 | Lee et al. | |
| 2009/0109150 | A1 * | 4/2009 | Han et al. | 345/82 |

(Continued)

FOREIGN PATENT DOCUMENTS

| | | |
|---|---|---|
| CN | 1694135 | 11/2005 |
| CN | 100386794 | 5/2008 |

(Continued)

OTHER PUBLICATIONS

Chinese Patent Office issued Office Action Dec. 28, 2013.

(Continued)

*Primary Examiner* — Kwang-Su Yang
(74) *Attorney, Agent, or Firm* — WPAT, PC; Justin King

(57) ABSTRACT

A pixel driving circuit, a pixel driving method and a light emitting display device are provided in the present invention. The pixel driving circuit includes first through fifth transistors and a capacitor and is for driving a light emitting diode. The third transistor forms a diode connection to make information of the threshold voltages of both the third transistor and the light emitting diode be stored in the capacitor in a data writing period. In a light emitting period, the second transistor compensates drift variation of the threshold voltages of the third transistor and the light emitting diode according to the information stored in the capacitor to provide a stable driving current for driving the light emitting diode.

10 Claims, 3 Drawing Sheets

(56) References Cited

U.S. PATENT DOCUMENTS

| | | | | |
|---|---|---|---|---|
| 2010/0001983 | A1 | 1/2010 | Abe | |
| 2010/0013868 | A1 * | 1/2010 | Chung | 345/690 |
| 2010/0103160 | A1 * | 4/2010 | Jeon et al. | 345/213 |

FOREIGN PATENT DOCUMENTS

| | | |
|---|---|---|
| CN | 101192373 | 6/2008 |
| CN | 101286298 | 10/2008 |
| CN | 101345022 | 1/2009 |
| TW | 200414818 | 8/2004 |
| TW | 200415938 | 8/2004 |
| TW | 200534202 | 10/2005 |

OTHER PUBLICATIONS

Taiwan Intellectual Property Office, "Office Action", Jun. 19, 2013, Taiwan.

* cited by examiner

PIXEL DRIVING CIRCUIT WITH CAPACITOR HAVING THRESHOLD VOLTAGES INFORMATION STORING FUNCTION, PIXEL DRIVING METHOD AND LIGHT EMITTING DISPLAY DEVICE

CROSS-REFERENCE TO RELATED APPLICATIONS

This application is based upon and claims the benefit of priority from the prior Taiwan Patent Application No. 099118888, filed Jun. 10, 2010, the entire contents of which are incorporated herein by reference.

BACKGROUND

1. Technical Field

The present invention generally relates to a pixel driving circuit, a pixel driving method and a light emitting display device and, particularly to a pixel driving circuit, a pixel driving method and a light emitting display device capable of compensating threshold voltage variations of a driving transistor and a light emitting diode (LED) in each pixel.

2. Description of the Related Art

Display devices are one of the most important man-machine interfaces in many modern electronic systems. Moreover, light emitting display devices whose pixels are constructed with LEDs (e.g., organic LEDs) have become one of the development mainstreams of the modern display device/panel technology.

The light emitting display devices are generally classified into passive type and active type display devices, while the characteristic of the active type display devices are better than that of the passive type display devices. In each pixel of an active type display device, besides that a LED is provided for emitting light to display images, at least one driving transistor (e.g., a thin film transistor) is provided for supplying a driving current to the LED for driving the LED to emit light. The driving current is relevant with a threshold voltage of the driving transistor, and the driven extent/degree of the LED is relevant with a threshold voltage of the LED.

In the application environment of modern manufacturing technology and the light emitting display device, as to the driving transistors of different pixels belonging to a same light emitting display device, threshold voltages of the driving transistors of the different pixels would occur drift variations along with the increase of working time, so that the brightness of the light emitting display device is uneven and thereby affecting the display quality of the light emitting display device. In addition, as to the LEDs of the different pixels, threshold voltages thereof may occur drift variations along with aging, which would result in display characteristics of the light emitting display device being affected.

BRIEF SUMMARY

Accordingly, in order to overcome the issue of the variations of threshold voltages associated with the prior art, the present invention provides a light emitting display device, a pixel driving circuit and a pixel driving method, for compensating the variations of threshold voltages.

Specifically, a pixel driving circuit in accordance with an embodiment of the present invention adapted to different pixels of a light emitting display device is provided. The pixel driving circuit is for providing a driving current to a light emitting diode (LED) of such the pixel. The pixel driving circuit includes a first transistor, a second transistor, a third transistor, a fourth transistor, a fifth transistor and a capacitor. Each of the first through fifth transistors includes a gate, a first terminal and a second terminal. The capacitor includes a first terminal and a second terminal. The LED includes a cathode and an anode. The first terminal of the first transistor is electrically coupled to receive an input signal, the gate of the first transistor is electrically coupled to receive a first scanning signal, and the second terminal of the first transistor is electrically coupled to the first terminal of the capacitor. The gate of the second transistor is electrically coupled to the second terminal of the capacitor, and the second terminal of the second transistor is electrically coupled to the anode of the LED. The gate of the third transistor is electrically coupled to the second terminal of the capacitor, the first terminal of the third transistor is electrically coupled to the gate of the second transistor, and the second terminal of the third transistor is electrically coupled to the anode of the LED. The gate of the third transistor is electrically coupled to the first terminal of the third transistor to form a diode connection. The gate of the fourth transistor is electrically coupled to receive a second scanning signal, the first terminal of the fourth transistor is electrically coupled to the second terminal of the first transistor, and the second terminal of the fourth transistor is electrically coupled to the anode of the LED. The gate of the fifth transistor is electrically coupled to receive the second scanning signal, the first terminal of the fifth transistor is electrically coupled to receive a first voltage, and the second terminal of the fifth transistor is electrically coupled to the first terminal of the second transistor. The cathode of the LED is electrically to receive a second voltage. The first voltage is greater than the second voltage.

In one embodiment of the present invention, the first scanning signal and the second scanning signal are used to drive a data writing period and a light emitting period of such the pixel, and characteristics of the second and third transistors can be matched with each other A pixel driving method in accordance with another embodiment of the present invention is adapted to be applied to a pixel, e.g., the above-mentioned pixel. The pixel driving method includes the following steps of: in a data writing period of the pixel, enabling a the capacitor to store information of the threshold voltages of both the third transistor and the LED; and in a light emitting period of the pixel, coupling the information of the threshold voltages of both the third transistor and the LED to the second transistor and thereby allowing the second transistor to provide a driving current to the LED according to the information of the threshold voltages of both the third transistor and the LED.

A light emitting display device in accordance with still another embodiment of the present invention is provided. Each of pixels of the light emitting display device can be provided with the above-mentioned pixel driving circuit and a LED. The light emitting display device further is equipped with a driving unit for driving each of the pixels thereof. In the present embodiment, the driving unit includes a data driver, a scanning driver, a controller unit and a power supply control unit. The data driver is for providing pixel voltages to the respective pixels as input signals. The scanning driver is for providing the first and the second scanning signals. The controller unit is for controlling the data driver and the scanning driver. The power supply control unit is for providing the first and the second voltages.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

In the following detailed description of the preferred embodiments, reference is made to the accompanying drawings which form a part hereof, and in which are shown by way of illustration specific embodiments in which the invention may be practiced. It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. Accordingly, the descriptions will be regarded as illustrative in nature and not as restrictive.

Figure 1:
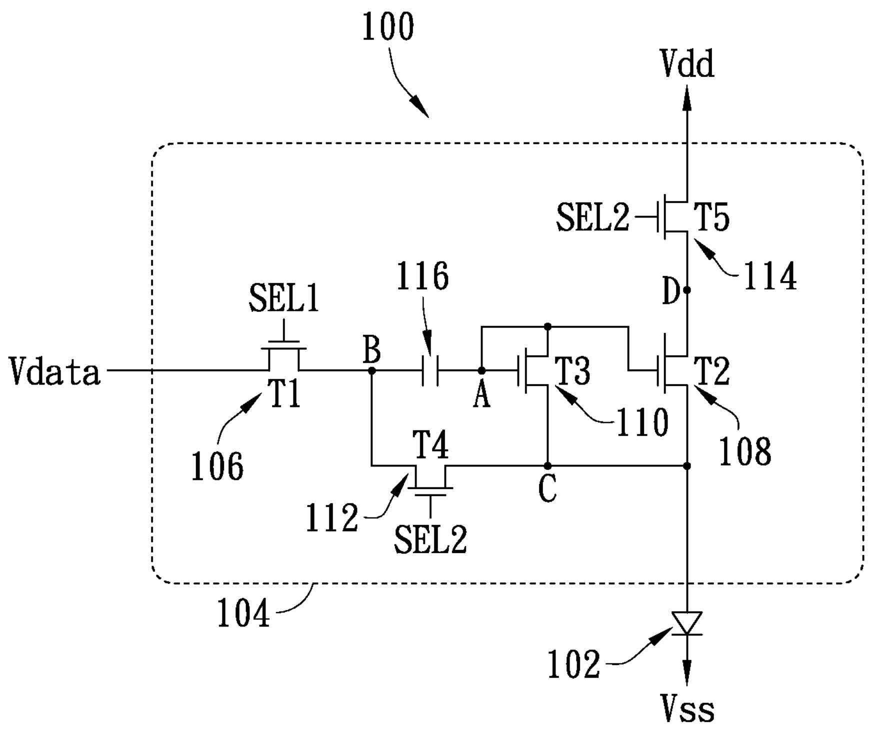
FIG. 1 shows a circuit diagram of an exemplary embodiment of a pixel driving circuit.

Referring to FIG. 1, showing a pixel driving circuit 104 in accordance with an exemplary embodiment of the present invention set in a pixel 100. The pixel 100 includes a light emitting diode (LED) 102. The pixel driving circuit 104 is provided for supplying a driving current to the LED 102. The pixel driving circuit 104 includes a capacitor 116 and transistors T1 through T5. The transistors T1 through T5 respectively are a first transistor 106, a second transistor 108, a third transistor 110, a fourth transistor 112, and a fifth transistor 114. The first through fifth transistors each includes a gate, a first terminal and a second terminal. The capacitor 116 includes a first and a second terminal. The LED 102 includes a cathode and an anode. The first terminal of the first transistor 106 is electrically coupled to receive an input signal Vdata (i.e., generally a pixel voltage), the gate of the first transistor 106 is electrically coupled to receive a first scanning signal SEL1, and the second terminal of the first transistor 106 is electrically coupled to the first terminal of the capacitor 116 at a node B. The gate of the second transistor 108 is electrically coupled to the second terminal of the capacitor 116 at a node A, and the second terminal of the second transistor 108 is electrically coupled to the anode of the LED 102 at a node C. The gate and the first terminal of the third transistor 110 respectively are electrically coupled to the second terminal of the capacitor 116 and the gate of the second transistor 108 both at a node A, and the second terminal of the third transistor 110 is electrically coupled to the anode of the LED 102 at the node C. The gate of the third transistor 110 is connected to the first terminal of the third transistor 110 at the node A to form a diode connection.

The gate of the fourth transistor 112 is electrically coupled to receive a second scanning signal SEL2, the first terminal of the fourth transistor 112 is electrically coupled to the second terminal of the first transistor 106 at the node B, and the second terminal of the fourth transistor 112 is electrically coupled to the anode of the LED 102 at the node C. The gate of the fifth transistor 114 is electrically coupled to receive the second scanning signal SEL2, the first terminal of the fifth transistor 114 is electrically coupled to receive a first voltage Vdd, and the second terminal of the fifth transistor 114 is electrically coupled to the first terminal of the second transistor 108 at a node D. The cathode of the LED 102 is electrically coupled to receive a second voltage Vss. The first voltage Vdd herein is greater than the second voltage Vss.

In the present pixel driving circuit 104, the first transistor 106, the second transistor 108, the third transistor 110, the fourth transistor 112 and the fifth transistor 114 may be n channel thin film transistors. Characteristics of the second transistor 108 and the third transistor 110 can be matched with each other. The LED 102 may be an organic LED.

Figure 2:
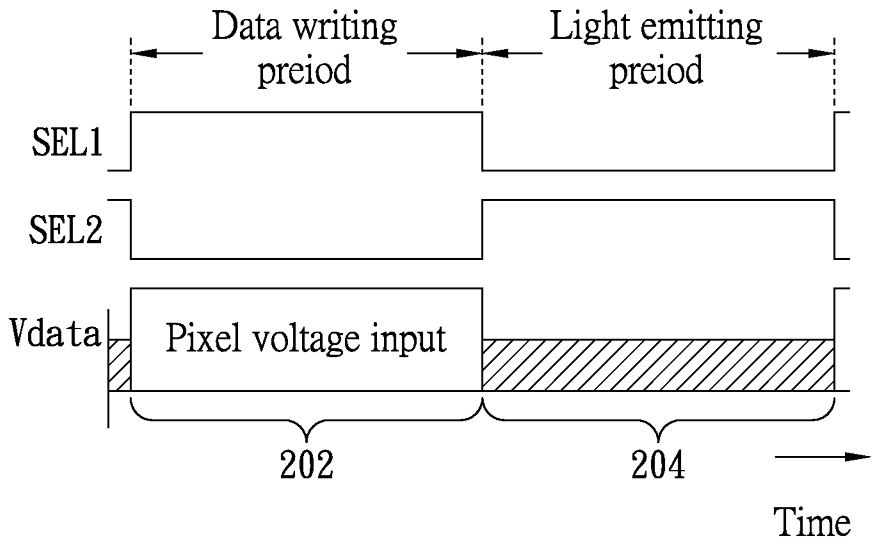
FIG. 2 shows a timing diagram of the pixel driving circuit of FIG. 1.

Referring to FIG. 2, showing an exemplary embodiment associated with the first scanning signal SEL1 and the second scanning signal SEL2 in FIG. 1 performing timing control in the pixel driving circuit 104 to drive a data writing period 202 and a light emitting period 204. In the data writing period 202, the first scanning signal SEL1 is at a logic high level, the second scanning signal SEL2 inversely maintains at a logic low level, and the input signal Vdata carries a pixel voltage. The first transistor 106 is turned on by the logic high level of the first scanning signal SEL1 to make the pixel voltage carried by the input signal Vdata couple to the first terminal of the capacitor 116 via the node B.

In the light emitting period 204, the first scanning signal SEL1 becomes a logic low level and the second scanning signal SEL2 becomes a logic high level, so that the second transistor 108 can provide a driving current to the LED 102, and the LED 102 can emit light with a corresponding brightness according to the pixel voltage in the data writing period 202. The first scanning signal SEL1 and the second scanning signal SEL2 can repeatedly and periodically make the pixel driving circuit 104 alternately operate in the data writing period 202 and the light emitting period 204. Lengths of time of the data writing period 202 and the light emitting period 204 can be the same or different.

Figure 3:
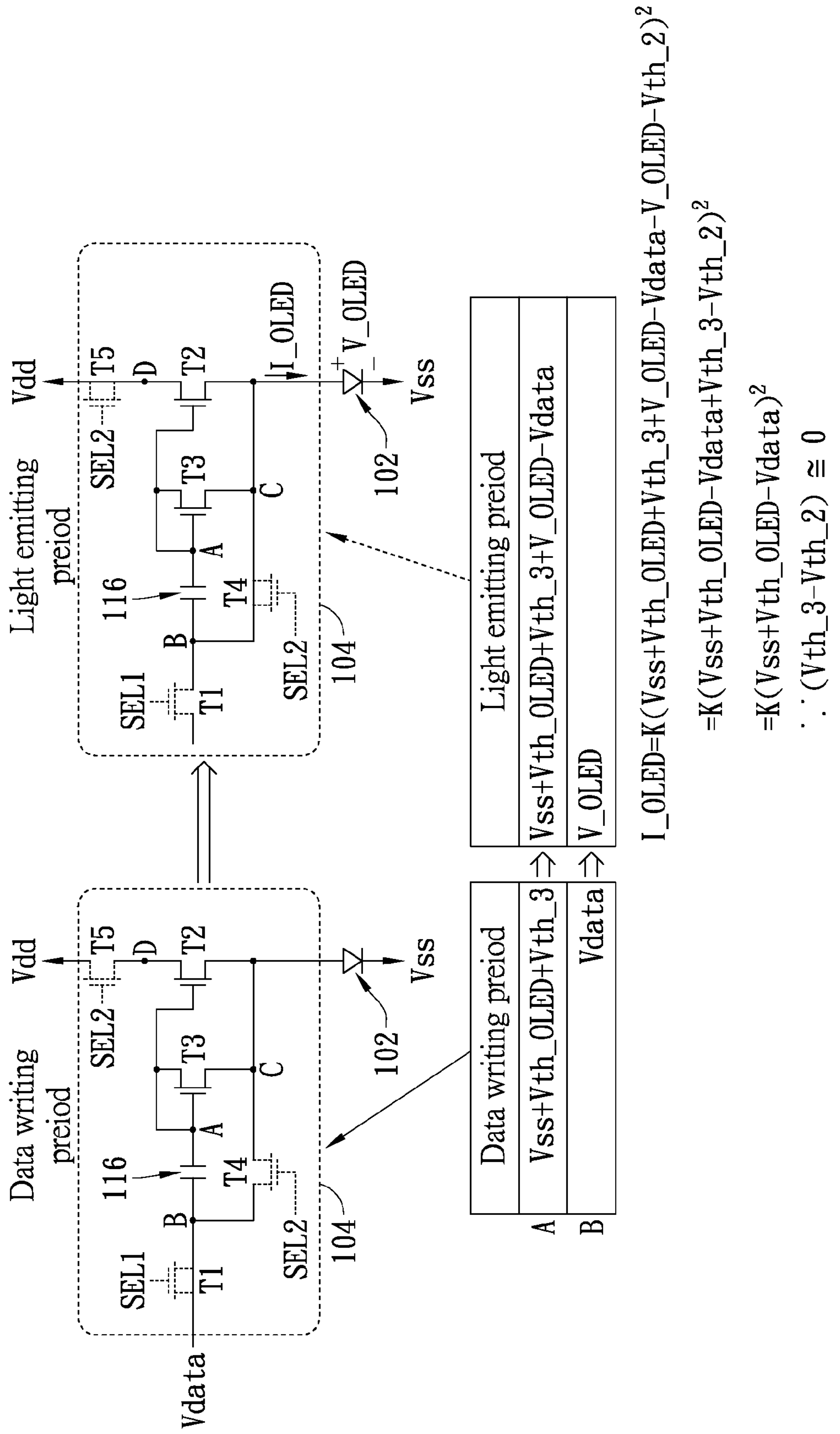
FIG. 3 shows an operation of the pixel driving circuit of FIG. 1.

Referring to FIG. 3, showing the pixel driving circuit 104 operating in the data writing period 202 and the light emitting period 204. In the data writing period 202, the first scanning signal SEL1 makes the transistor T1 be turned on, so that the node B can receive the pixel voltage carried by the input signal Vdata. The node A receives the second voltage Vss via the node C and the LED 102. A voltage value at the node A is (Vss+Vth_OLED+Vth_3), where Vth_OLED is a threshold voltage of the LED 102, and Vth_3 is a threshold voltage of the transistor T3.

In the subsequent light emitting period 204, the second scanning signal SEL2 makes the transistors T4 and T5 be turned on. The turned-on transistor T4 allows a voltage at the node C to be coupled to the node B, and thus the voltage value at the node B is V_OLED which is the cross voltage between the anode and cathode of the LED 102. Since charges stored in the capacitor 116 would maintain the voltage difference between the node A and the node B, when the voltage at the node B changes to be V_OLED, the voltage at the node A would change to be (Vss+Vth_OLED+Vth_3+V_OLED−

Vdata) correspondingly. Since the transistor T2 provides a driving current I_OLED to the LED 102 according to a voltage difference between the threshold voltage of the transistor T2 and the cross voltage between the gate and the source (i.e., the second terminal of the transistor T2) of the transistor T2, the driving current I_OLED depends on the voltage difference between the nodes A and C and the threshold voltage of the transistor T2. The driving current I_OLED can be calculated from the formula that I_OLED=K*(Vss+Vth_OLED+Vth_3+V_OLED−Vdata−V_OLED−Vth_2)$^2$, where Vth_2 is a threshold voltage of the transistor T2, K is a constant. That is, I_OLED=K*(Vss+Vth_OLED−Vdata+Vth_3−Vth_2)$^2$. In a preferred embodiment, the transistors T2 and T3 are matched with each other, and thus the threshold voltage Vth_2 of the transistor T2 is approximately close to the threshold voltage Vth_3 of the transistor T3, so that (Vth_3−Vth_2) is substantially equal to 0. Accordingly, the above formula associated with the driving current I_OLED can be simplified as I_OLED=K*(Vss+Vth_OLED−Vdata)$^2$. As the driving current I_OLED is a function of the input signal Vdata (i.e., generally pixel voltage), the driving current I_OLED would vary along with the change of the input signal Vdata, and the LED 102 can emit different gray scale lights according to needs of displayed images.

Moreover, as seen from the formula I_OLED=K*(Vss+Vth_OLED−Vdata)$^2$ that: according to the circuit arrangement of the present pixel driving circuit 104, when the transistor T2 provides the driving current I_OLED to the LED 102 in the light emitting period for driving the LED 102 to emit light, the threshold voltage Vth_2 of the transistor T2 is excluded from the driving current I_OLED formula, so that the variation and drift of the threshold voltage Vth_2 of the transistor T2 will no longer affect the driving current I_OLED, the brightness of pixel can be even and thus improving the display quality of the light emitting display device. As the transistors T2 and T3 are common gate (the gates of transistors T2 and T3 all are electrically coupled to the node A) and have matched characteristics, even if the threshold voltage Vth_2 of the transistor T2 and the threshold voltage Vth_3 of the transistor T3 drift with aging, the drifting extents of the threshold voltages Vth_2 and Vth_3 also are matched with each other, so that (Vth_3−Vth_2) is substantially equal to zero and thus the threshold voltage Vth_2 of the transistor T2 would not affect the driving current I_OLED.

In addition, from the formula I_OLED=K*(Vss+Vth_OLED−Vdata)$^2$, it can be found that the threshold voltage Vth_OLED of the LED 102 acts as one of influence factors for the driving current I_OLED and thus can compensate the drift and variation of the threshold voltage Vth_OLED. In particular, when the LED 102 becomes aging, its threshold voltage Vth_OLED becomes greater because of positive drifting, and thereby affecting the brightness of the LED 102. That is, if the driving current I_OLED is maintained unchanged, the brightness of the LED 102 in the prior art becomes weaker resulting from aging. In contrast, owing to the circuit arrangement of the pixel driving circuit 104 of the present invention, when drifting of the threshold voltage Vth_OLED of the LED 102 increases because of aging, the driving current I_OLED provided by the transistor T2 correspondingly increases, and thus can avoid/prevent the aging of the LED 102 affecting the display quality.

According to the description accompanying with FIGS. 1 through 3, it is found that: in the data writing period of the present invention, the threshold voltage Vth_OLED of the LED 102 and the threshold voltage Vth_3 of the transistor T3 (equivalently, the threshold voltage Vth_2 of the transistor T2) are coupled to the capacitor 116 by the diode-connected transistor T3, thereby compensating the drifting of the threshold voltages Vth_OLED and Vth_2 in the light emitting period. In other words, in the data writing period, the present invention provides the capacitor 116 and stores information of the threshold voltages Vth_OLED and Vth_3 in the capacitor 116 under the effect of the transistor T3. In the light emitting period, the information of the threshold voltages Vth_OLED and Vth_3 would be coupled to the transistor T2 from the capacitor 116, and thereby the transistor T2 can adjust the driving current I_OLED according to the information of the threshold voltages Vth_OLED and Vth_3.

Figure 4:
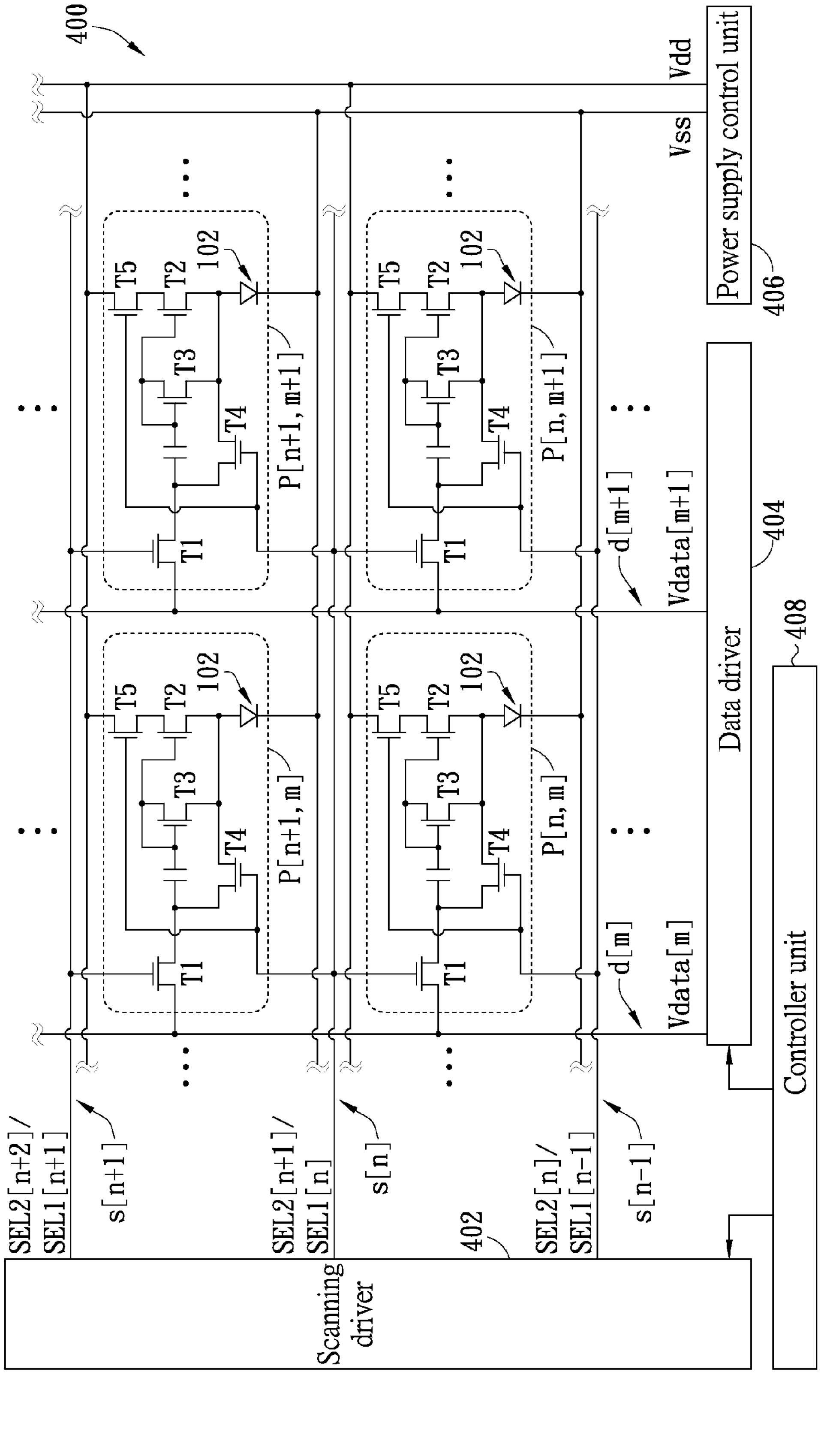
FIG. 4 shows the pixel driving circuit of FIG. 1 being used in a light emitting display device.

Referring to FIG. 4, showing the pixel driving circuit 104 (as shown in FIGS. 1 and 3) being applied to pixels of an exemplary light emitting display device. As illustrated in FIG. 4, the light emitting display device 400 includes a plurality of pixels arranged in a matrix, herein, pixels P [n], P [n, m+1], P[n+1, m], and P [n+1, m+1] are taken as an example for the purpose of illustration. Each of the exemplary pixels includes a LED 102. By gathering the LEDs 102 of the pixels in the light emitting display device 400, the light emitting display device 400 can emit light for displaying image. Moreover, in order to drive the LED 102, each of the pixels is provided with the transistors T1 through T5 and a capacitor, and whereby the pixel driving circuit 104 (as shown in FIGS. 1 and 3) associated with the present invention is implemented.

In addition, a scanning driver 402, a data driver 404, a controller unit 408 and a power supply control unit 406 illustrated in FIG. 4 cooperatively form a driving unit of the light emitting display device 400 to drive each of the pixels. In detail, the scanning driver 402 is electrically coupled to pixel rows respectively by a plurality of selecting lines (also referred to as scanning lines) to provide the first and second scanning signals for the pixel driving circuit of each pixel. For example, the scanning driver 402 provides a first scanning signal SEL1 [n+1] and a second scanning signal SEL2[n+1] to the pixel driving circuits of the pixels P[n+1] and P [n+1, m+1] by the selecting lines s[n+1] and s[n] respectively. For the pixels P [n, m] and P [n, m+1] in the nth pixel row, the scanning driver 402 provide a first scanning signal SEL1 [n] and a second scanning signal SEL2[n] by the selecting lines s[n] and s[n−1] respectively. As illustrated in FIG. 4, each two adjacent pixel rows share a same selecting line, and herein a signal provided on the selecting line serves as the first scanning signal as well as the second scanning signal of the two pixel rows respectively. For example, the nth pixel row and the (n+1)th pixel row share the same selecting line s [n], the signal provided on the selecting line s [n] is the first scanning signal SEL1 [n] of the nth pixel row and also is the second scanning signal SEL2 [n+1] of the (n+1) th pixel row. In other words, when the pixels in the nth pixel row operates in the data writing period, the pixels in the (n+1)th pixel row operates in the light emitting period. Likewise, the (n−1)th pixel row and the nth pixel row share the same selecting line s [n−1], the signal provided on the selecting line s [n−1] is the first scanning signal SEL1 [n−1] of the (n−1)th pixel row as well as the second scanning signal SEL2 [n] of the nth pixel row. The (n+1)th pixel row and the (n+2)th pixel row share the same selecting line s [n+1], the signal provided on the selecting line s [n+1] is the first scanning signal SEL1 [n+1] of the (n+1)th pixel row as well as the second scanning signal SEL2 [n+2] of the (n+2)th pixel row.

As illustrated in FIG. 4, the data driver 404 provides input signals to pixels arranged in columns via a plurality of data lines respectively. For example, for the pixels P [n, m] and P [n+1, m] in the mth column, the data driver 404 provides an input signal Vdata [m] via the data line d [m]. For the pixels P [n, m+1] and P [n+l, m+1] arranged in the (m+1)th column, the data driver 404 provides an input signal Vdata [m+1] for the pixel driving circuits of the pixels arranged in the (m+1)th column. The control unit 408 is for controlling the data driver 404 and the scanning driver 402 and coordinating operation sequences of them. The power supply control unit 406 is for providing the first voltage Vdd and the second voltage Vss for each pixel as power supply voltages.

In summary, compared with the prior art, the present invention can compensate the drift variations of the threshold voltages of the transistor and the LED, facilitating the brightness of the light emitting display device to keep stable and even and not degraded along with aging, thereby improving the display quality of the light emitting display device.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A pixel driving circuit comprising:

a first transistor comprising a gate, a first terminal and a second terminal, wherein the first terminal of the first transistor is electrically coupled to receive an input signal, and the gate of the first transistor is electrically coupled to receive a first scanning signal;

a capacitor comprising a first terminal and a second terminal, wherein the first terminal of the capacitor is directly electrically coupled to the second terminal of the first transistor;

a second transistor comprising a gate, a first terminal and a second terminal, wherein the gate of the second transistor is electrically coupled to the second terminal of the capacitor, and the second terminal of the second transistor is electrically coupled to an anode of a light emitting diode;

a third transistor comprising a gate, a first terminal and a second terminal, wherein the gate of the third transistor is electrically coupled to the second terminal of the capacitor and thereby the capacitor is electrically coupled between the second terminal of the first transistor and the gate of the third transistor, the first terminal of the third transistor is electrically coupled to the gate of the second transistor, the second terminal of the third transistor is electrically coupled between the second terminal of the second transistor and the anode of the light emitting diode, and the gate of the third transistor is further electrically coupled to the first terminal of the third transistor;

a fourth transistor comprising a gate, a first terminal and a second terminal, wherein the gate of the fourth transistor is electrically coupled to receive a second scanning signal, the first terminal of the fourth transistor is electrically coupled between the second terminal of the first transistor and the first terminal of the capacitor, and the second terminal of the fourth transistor is electrically coupled between the second terminal of the second transistor and the anode of the light emitting diode;

a fifth transistor comprising a gate, a first terminal and a second terminal, wherein the gate of the fifth transistor is electrically coupled to receive the second scanning signal, the first terminal of the fifth transistor is electrically coupled to receive a first voltage, and the second terminal of the fifth transistor is electrically coupled to the first terminal of the second transistor and thereby the fifth transistor is electrically coupled between the first voltage and the first terminal of the second transistor; and a cathode of the light emitting diode electrically coupled to receive a second voltage.

2. The pixel driving circuit as claimed in claim 1, wherein the first through fifth transistors are n channel thin film transistors.

3. The pixel driving circuit as claimed in claim 1, wherein the first scanning signal and the second scanning signal are for driving a data writing period and a light emitting period.

4. The pixel driving circuit as claimed in claim 1, wherein the gate and the first terminal of the third transistor are connected together to form a diode connection.

5. The pixel driving circuit as claimed in claim 1, wherein characteristics of the second and third transistors are matched with each other.

6. A pixel driving method applied in a pixel, the pixel comprising a first transistor, a second transistor, a capacitor and a light emitting diode, wherein the first transistor comprises a gate, a first terminal and a second terminal, the gate of the first transistor is directly electrically coupled to a first terminal of the capacitor, the first terminal of the first transistor is electrically coupled to a first voltage through a switching element, the second terminal of the first transistor is electrically coupled to an anode of the light emitting diode, the second transistor comprises a gate, a first terminal and a second terminal, the gate of the second transistor is directly electrically coupled to the first terminal of the capacitor, the first terminal of the second transistor is electrically coupled to the gate of the first transistor, the second terminal of the second transistor is electrically coupled between the second terminal of the first transistor and the anode of the light emitting diode, a second terminal of the capacitor as a data writing terminal, and a cathode of the light emitting diode is electrically coupled to a second voltage; the pixel driving method comprising:

in a data writing period, enabling the capacitor to store information of threshold voltages of both the second transistor and the light emitting diode while turning off the switching element to prevent the first voltage being applied to the first terminal of the first transistor; and in a light emitting period, coupling the information of the threshold voltages of both the second transistor and the light emitting diode to the first transistor while turning on the switching element, and thereby the first transistor provides a driving current to the light emitting diode according to the information of the threshold voltages of both the second transistor and the light emitting diode.

7. The pixel driving method as claimed in claim 6, wherein characteristics of the first and second transistors are matched with each other, and the first transistor provides the driving current to the light emitting diode further according to a voltage difference between threshold voltages of the first and second transistors.

8. A light emitting display device comprising:

at least a pixel, each of the at least a pixel comprising:

a light emitting diode comprising a cathode and an anode;

a first transistor comprising a gate, a first terminal and a second terminal, wherein the first terminal of the first transistor is electrically coupled to receive an input signal, and the gate of the first transistor is electrically coupled to receive a first scanning signal;

a capacitor comprising a first terminal and a second terminal, wherein the first terminal of the capacitor is directly electrically coupled to the second terminal of the first transistor;

a second transistor comprising a gate, a first terminal and a second terminal, wherein the gate of the second transistor is electrically coupled to the second terminal of the capacitor, and the second terminal of the second transistor is electrically coupled to the anode of the light emitting diode;

a third transistor comprising a gate, a first terminal and a second terminal, wherein the gate of the third transistor is electrically coupled to the second terminal of the capacitor and thereby the capacitor is electrically coupled between the second terminal of the first transistor and the gate of the third transistor, the first terminal of the third transistor is electrically coupled to the gate of the second transistor, the second terminal of the third transistor is electrically coupled between the second terminal of the second transistor and the anode of the light emitting diode, and the gate of the third transistor is further electrically coupled to the first terminal of the third transistor;

a fourth transistor comprising a gate, a first terminal and a second terminal, wherein the gate of the fourth transistor is electrically coupled to receive a second scanning signal, the first terminal of the fourth transistor is electrically coupled to the second terminal of the first transistor, and the second terminal of the fourth transistor is electrically coupled between the second terminal of the second transistor and the anode of the light emitting diode;

a fifth transistor comprising a gate, a first terminal and a second terminal, wherein the gate of the fifth transistor is electrically coupled to receive the second scanning signal, the first terminal of the fifth transistor is electrically coupled to receive a first voltage, and the second terminal of the fifth transistor is electrically coupled to the first terminal of the second transistor and thereby the fifth transistor is electrically coupled between the first voltage and the first terminal of the second transistor; the cathode of the light emitting diode electrically coupled to receive a second voltage; and a driving unit for driving each of the at least a pixel, and comprising:

a data driver for providing the input signal; and a scanning driver for providing the first scanning signal and the second scanning signal.

9. The light emitting display device as claimed in claim 8, wherein the driving unit further comprises a controller unit for controlling the data driver and the scanning driver.

10. The light emitting display device as claimed in claim 8, wherein the driving unit further comprises a power supply control unit for providing the first voltage and the second voltage.

* * * * *